(12) United States Patent
Ward et al.

(10) Patent No.: US 6,932,740 B2
(45) Date of Patent: Aug. 23, 2005

(54) METHOD FOR CONTROLLING IGNITION OF AN INTERNAL COMBUSTION ENGINE

(75) Inventors: Lance M. Ward, Lansing, MI (US); John D. Meaney, Hartland, MI (US)

(73) Assignee: TCI Automotive, LLC, Memphis, TN (US)

( * ) Notice: Subject to any disclaimer, the term of this patent is extended or adjusted under 35 U.S.C. 154(b) by 0 days.

(21) Appl. No.: 10/031,862

(22) PCT Filed: Mar. 9, 2001

(86) PCT No.: PCT/US01/07582

§ 371 (c)(1),
(2), (4) Date: Aug. 26, 2003

(87) PCT Pub. No.: WO01/66377

PCT Pub. Date: Sep. 13, 2001

(65) Prior Publication Data

US 2004/0038777 A1 Feb. 26, 2004

Related U.S. Application Data

(60) Provisional application No. 60/187,954, filed on Mar. 9, 2000.

(51) Int. Cl.[7] .............................................. F16H 59/76
(52) U.S. Cl. ....................... 477/101; 477/106; 477/107; 123/406.59
(58) Field of Search ............................... 477/101, 105, 477/106, 107; 123/406.5, 406.59

(56) References Cited

U.S. PATENT DOCUMENTS

| | | | |
|---|---|---|---|
| 4,852,537 A | 8/1989 | Nagano et al. .............. 123/419 |
| 4,895,120 A | 1/1990 | Tobinaga et al. ............ 123/417 |
| 4,924,832 A | 5/1990 | Abe ............................. 123/419 |
| 5,161,503 A | 11/1992 | Yano et al. .................. 123/335 |
| 5,609,218 A | * 3/1997 | Yamashita et al. .......... 180/197 |
| 5,887,568 A | 3/1999 | Takeyama et al. .......... 123/306 |
| 6,305,347 B1 | * 10/2001 | Russell ........................ 123/295 |
| 6,401,022 B2 | * 6/2002 | Kubota et al. ................. 701/54 |

FOREIGN PATENT DOCUMENTS

| | | | | |
|---|---|---|---|---|
| JP | 04-293627 | * 10/1992 | .................. 477/107 |
| JP | 2002-285944 | * 10/2002 | |

* cited by examiner

Primary Examiner—Ha Ho
(74) Attorney, Agent, or Firm—Clark Hill PLC

(57) ABSTRACT

A method for controlling the ignition of an internal combustion engine (10) for a motor vehicle. More specifically, the method controls the timing of ignition for each of cylinder of the internal combustion engine (10). Control of the timing is based on two parameters, i.e., the speed at which the internal combustion engine (10) is operating and the gear in which the transmission (22) is operating. The speed is measured in terms of revolutions per minute. The gear helps to gauge what type of load may be present on the internal combustion engine (10). By identifying each of these parameters, it may easily be determined at what value the timing may be. If the specific speed of the vehicle is not located within the look-up table, where the data is stored, the method will interpolate the timing value based on values close to the value of the speed of the internal combustion engine (10) based on the neighboring values thereof.

3 Claims, 2 Drawing Sheets

US 6,932,740 B2

METHOD FOR CONTROLLING IGNITION OF AN INTERNAL COMBUSTION ENGINE

This application claims the benefit of Provisional Application No. 60/187,954 filed Mar. 9, 2000.

BACKGROUND ART

1. Field of the Invention

The invention relates to a method for controlling the ignition of an internal combustion engine. More specifically, the invention relates to a method for modifying the timing associated with the ignition of individual cylinders of an internal combustion engine of a motor vehicle.

2. Description of the Related Art

Ignition control of an internal combustion engine is important to enthusiasts that want to optimize the operation of their motor vehicles. Each ignition in each cylinder must be optimized in order to maximize the performance of an internal combustion engine.

Oftentimes, control of ignition is elaborate. Vibrations, pressures, temperatures and other parameters of an internal combustion engine are measured constantly. The timing of the ignition is advanced or retarded from top dead center depending on the measurements. The timing can change from cycle to cycle or from operating condition to operating condition and the timing of the ignition is changed continually.

These types of systems are complex in design and operation. Further, these types of systems require hardware that, in many instances, must be installed during the manufacture of the internal combustion engine. Therefore, these systems are inappropriate for those that are seeking to improve the performance of the internal combustion engine after it has been manufactured and operated.

SUMMARY OF THE INVENTION

A method is disclosed for controlling the timing of the ignition in each of a plurality of cylinders of an internal combustion engine that is used to power a transmission having a plurality of gears. The transmission is powered by the internal combustion engine through a crankshaft. The method includes the step of identifying the gear transmitting power generation from the internal combustion engine. The method then measures the revolutions per minute for the internal combustion engine. The method establishes a measured revolution per minute value. The method then generates a timing parameter for ignition for each of the cylinders of the internal combustion engine.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
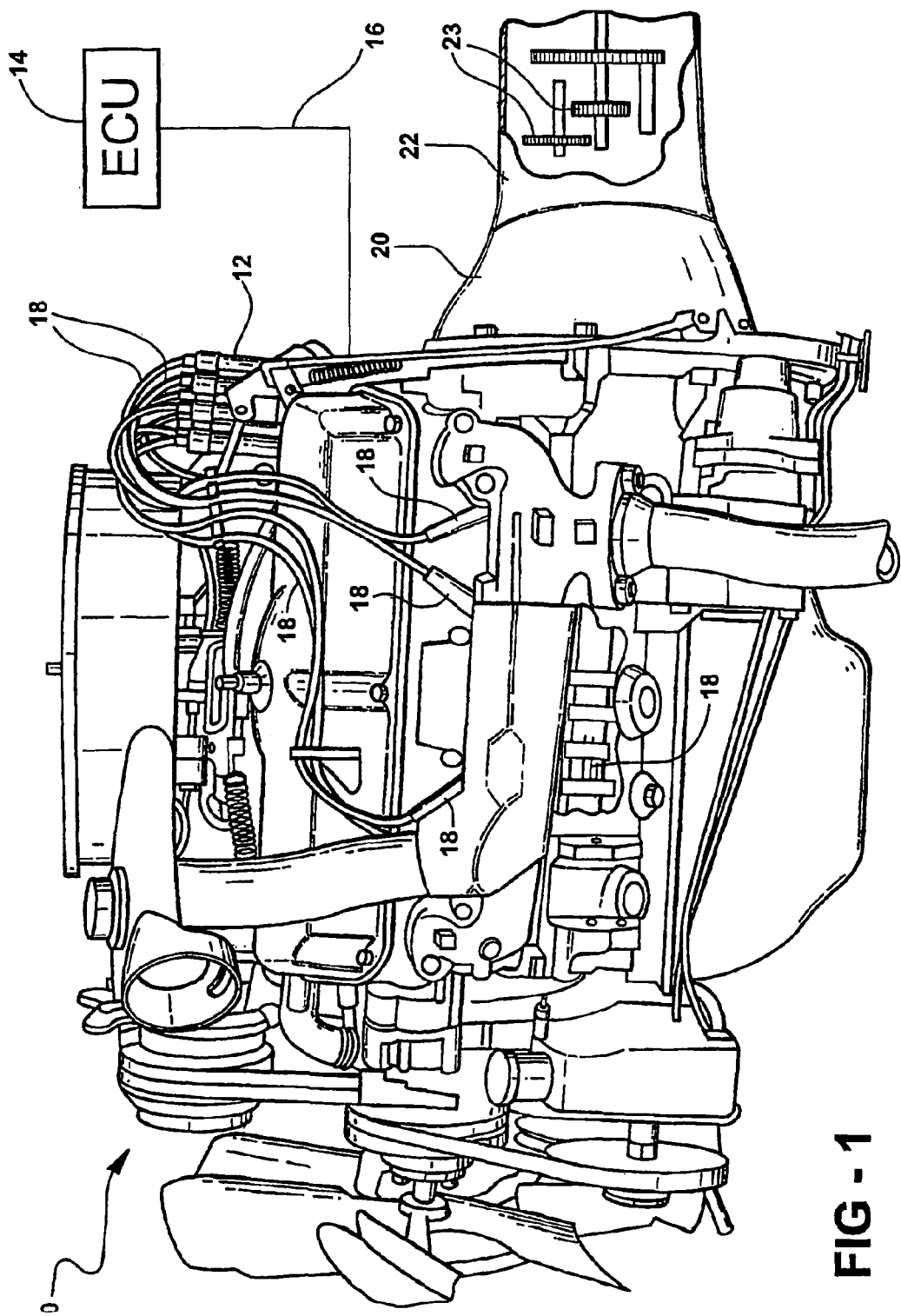
FIG. 1 is a perspective view of an internal combustion engine, partially cut away, incorporating one embodiment of the invention.

Referring to FIG. 1, a perspective view of an engine for a motor vehicle is generally indicated at 10. The engine 10 is an internal combustion engine. The internal combustion engine 10 may include a distributor 12 or, in the alternative, it may include an electronic set-up more appropriate for operation with an electronic fuel injector system (neither shown). The internal combustion engine 10 is controlled by an engine control unit 14. A bus, graphically represented by line 16, is used to communicate commands and data transfer between the engine control unit 14, the various electronic components and sensors employed by the internal combustion engine 10. The engine control unit ("ECU") 14 provides all electrical and electronic communication between the various subsystems of the internal combustion engine 10 and other systems of the motor vehicle (none shown). The ECU 14 will be described in greater detail subsequently. The internal combustion engine 10 includes a plurality of cylinders represented in FIG. 1 by each of the electrical wires 18 that extend out of the distributor 12. Each of the cylinders includes a piston and at least one intake and exhaust valve (none shown). The valves are moved by a camshaft and the pistons move a crankshaft 18 as is well known in the art.

The crankshaft 18 extends into a torque converter 20, which is mechanically connected to a transmission 22. The transmission 22, partially cut away in FIG. 1, includes a plurality of gears 23, which are selected either automatically or manually to determine the conversion of the torque generated by the torque converter 20 to the rotational speed of the wheels of the motor vehicle (neither shown).

Figure 2:
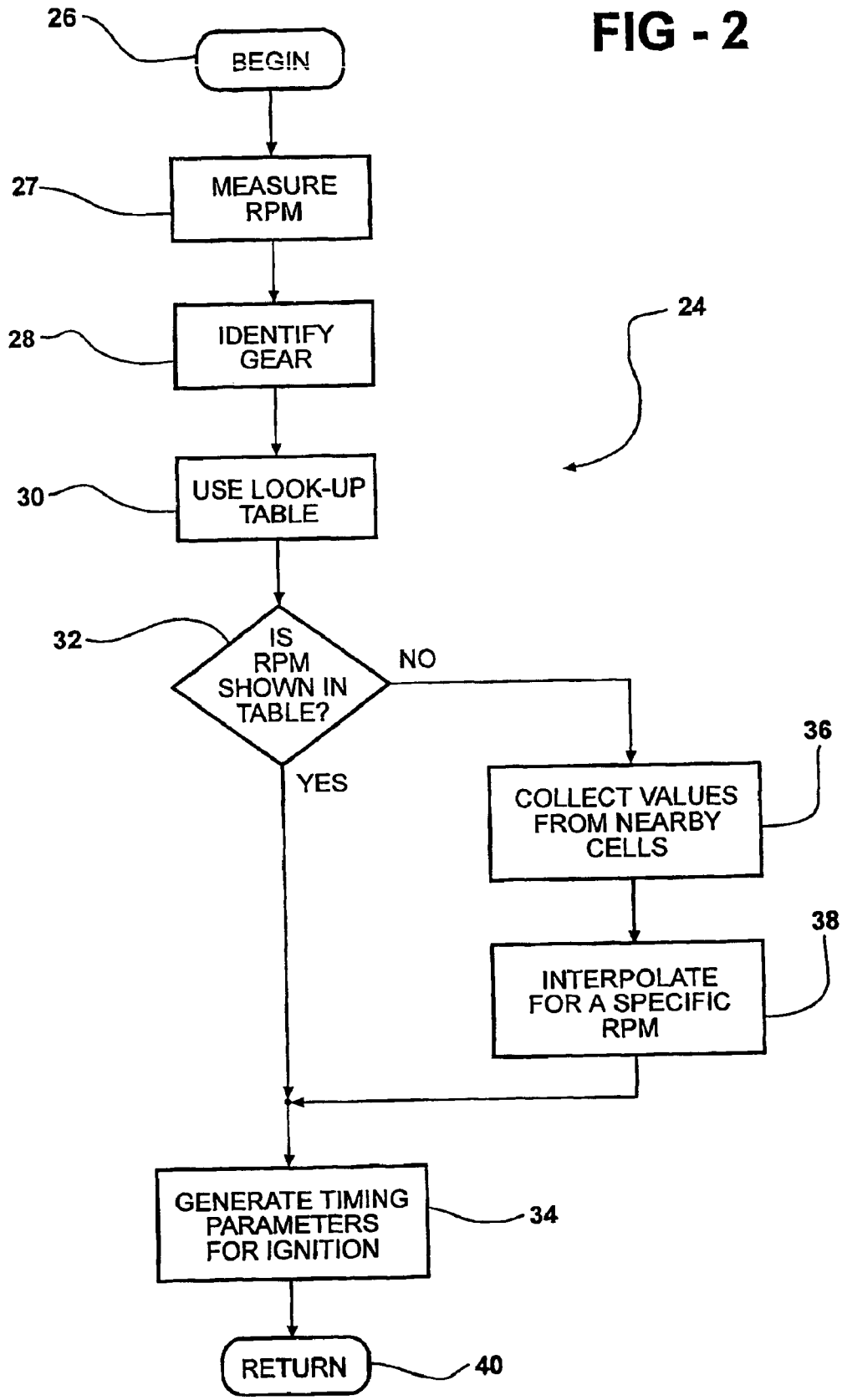
FIG. 2 is a logic diagram of one embodiment of the invention.

Referring to FIG. 2, a logic diagram of the method according to the invention is generally indicated at 24. The method begins at 26. The ECU 14 measures a parameter or output of the internal combustion engine 10 at 27. In the preferred embodiment, the output measured is the amount of revolutions made per minute (RPM) by the crankshaft 18 of the internal combustion engine 10. The ECU 14 identifies the gear 23 in which the transmission 22 is currently operating at 28. Using the information of which gear the transmission 22 is in, the ECU 14 uses a look-up table at 30 to determine the timing, i.e., advance or retard, of the ignition for a particular cylinder. The look-up table includes a row of data for every gear found in the transmission 22. In one embodiment, the table also includes sixteen columns. Each of the sixteen columns identifies the value for the revolutions per minute (RPM) of the crankshaft. It may be appreciated by those skilled in the art that there may be any number of gears 23 in the transmission 22 and there may be any number of columns delineating graduations in revolutions per minute.

Once the ECU 14 accesses the look-up table, it determines whether the specific RPM is represented in the look-up table. This step is performed at 32. If the specific value for the RPM is represented in the look-up table, the timing for a particular ignition for a particular cylinder of the internal combustion engine 10 is generated at 34.

If the specific value for the RPM is not represented in the look-up table, the ECU 14 collects values in cells adjacent the value closest to the measured RPM at 36. Once these values are collected, the ECU 14 linearly interpolates these values at 38 to identify a timing parameter for the ignition at 34. The method then returns at 40 to begin the process again at 26. This process is done for each cylinder independently of the others allowing spark advances or retardations based on the individual cylinder being fired.

The timing of the ignition for a particular cylinder is determined to optimize the combustion characteristics of the fuel found in the particular cylinder of the internal combustion engine 10. If the timing advances too far, the fuel in the cylinder of the internal combustion engine 10 will detonate. Detonation is often referred to as "knock." This phenomenon is undesired because it reduces the performance of the internal combustion engine 10 and jeopardizes the integrity of the internal combustion engine 10. By not advancing the timing of the ignition, performance is compromised resulting in a reduced fuel economy. By utilizing the look-up table, the timing of the ignition of fuel in a cylinder can be more highly tuned wherein the tuning is a function of the gear in which the transmission 22 is operating. Identifying the gear 23 currently being used by the transmission 22 adds sophistication to the ability to time the ignition of fuel in the cylinders of the internal combustion engine 10.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

We claim:

1. A method for controlling the timing of ignition in each of a plurality of cylinders of an internal combustion engine used to power a transmission having a plurality of gears through a crankshaft, the method comprising the steps of:

identifying one of the plurality of gears transmitting power generation from the internal combustion engine;

measuring a speed of operation for the internal combustion engine by measuring the revolutions per minute of the crankshaft of the internal combustion engine to establish a measured revolution per minute value;

identifying timing parameters using a look-up table;

determining whether the measured revolution per minute value is represented in the look-up table; and generating the timing parameter for ignition for each of the cylinders of the internal combustion engine.

2. A method set forth in claim 1 including the step of interpolating the timing parameters from member values of the look-up table close to the measured revolution per minute value.

3. A method as set forth in claim 2 including the step of collecting values for revolutions per minute from cells in the look-up table that are close to the measured revolution per minute value.

* * * * *